United States Patent
Bassa et al.

[11] Patent Number: 5,917,898
[45] Date of Patent: *Jun. 29, 1999

[54] TELECOMMUNICATIONS NETWORK TRAFFIC MANAGEMENT SYSTEM

[75] Inventors: Paul Anthony Bassa; Joseph James Isaac, both of London, United Kingdom

[73] Assignee: British Telecommunications public limited company, London, United Kingdom

[*] Notice: This patent is subject to a terminal disclaimer.

[21] Appl. No.: 08/464,830

[22] PCT Filed: Oct. 24, 1994

[86] PCT No.: PCT/GB94/02333

§ 371 Date: Jun. 27, 1995

§ 102(e) Date: Jun. 27, 1995

[87] PCT Pub. No.: WO95/12290

PCT Pub. Date: May 4, 1995

Related U.S. Application Data

[63] Continuation-in-part of application No. 08/200,408, Feb. 23, 1994.

[30] Foreign Application Priority Data

Oct. 28, 1993 [EP] European Pat. Off. .............. 93308581

[51] Int. Cl.$^6$ .................................................. H04M 15/00
[52] U.S. Cl. .............................. 379/133; 379/1; 379/10; 379/14; 379/32; 370/241; 370/252
[58] Field of Search .................................. 379/133, 1, 9, 379/10, 14, 15, 16, 17, 32, 33, 34, 220, 221, 219, 229, 113; 370/241, 252, 242, 248

[56] References Cited

U.S. PATENT DOCUMENTS

| | | | |
|---|---|---|---|
| 4,464,543 | 8/1984 | Kline et al. ................................ | 379/10 |
| 5,042,027 | 8/1991 | Takase et al. .............................. | 370/54 |
| 5,049,873 | 9/1991 | Robins et al. ..................... | 340/825.06 |
| 5,058,105 | 10/1991 | Mansour et al. ........................... | 370/16 |
| 5,142,570 | 8/1992 | Chaudhary et al. ..................... | 379/221 |
| 5,212,475 | 5/1993 | Thoma ................................ | 340/825.16 |
| 5,222,128 | 6/1993 | Daly et al. ................................ | 379/221 |
| 5,271,000 | 12/1993 | Engbersen et al. ........................ | 370/13 |
| 5,278,823 | 1/1994 | Handel ........................................ | 370/13 |
| 5,278,977 | 1/1994 | Spencer et al. ........................... | 395/575 |

(List continued on next page.)

OTHER PUBLICATIONS

Proceedings of the National Communications Fourm, vol. 42, No.1, Oct. 1989, Chicago, U.S., pp. 474–482.

IEEE Network Operations and Management Symposium, Session 18, Paper 1, vol.2, Apr. 6, 1992, pp. 520–532, Stinson et al.

IEEE Global Telecommunications Conference & Exhibition, Session 408, Paper 6, vol.1,2 Dec. 1990, pp. 656–662 Weihmayer et al.

(List continued on next page.)

*Primary Examiner*—Curtis A. Kuntz
*Assistant Examiner*—Binh K. Tieu
*Attorney, Agent, or Firm*—Nixon & Vanderhye, P.C.

[57] ABSTRACT

An international telecommunications network includes a set of international exchanges located in a particular country which connect a national telecommunications network situated in that country with networks situated in other countries. The international network includes a traffic management system in the form of an expert system having a set of knowledge sources. An identifier identifies alarms relating to traffic and a priority arranges the alarms in order of priority. A diagnose diagnoses the cause or causes of the alarms by proposing suspected causes and investigating them in relation to traffic and network data. A resolver proposes remedies for the causes of the alarms by reasoning over each cause in relation to data on traffic associated with the cause, reasoning over each remedy in relation to data on traffic in the neighborhood of the remedy to determine a figure of merit for the remedy and then arranging the remedies in order of merit. Remedies may be implemented automatically or under the control of an operator.

20 Claims, 6 Drawing Sheets

U.S. PATENT DOCUMENTS

| | | | |
|---|---|---|---|
| 5,309,448 | 5/1994 | Bouloutas et al. | 371/29.1 |
| 5,311,585 | 5/1994 | Armstrong et al. | 379/221 |
| 5,459,777 | 10/1995 | Bassa et al. | 379/133 |
| 5,475,732 | 12/1995 | Pester, III | 379/34 |

OTHER PUBLICATIONS

IEEE Communications Magazine, vol. 28, No. 10, Oct. 1990, pp. 76–81, Wolf 'Advanced techniques for managing telecommunications networks'.

IEEE Inforcom 85 Proceedings, Mar. 26, 1985, , pp. 43–51, Westcott et al Automated network management.

IEEE Global Telecommunications Conference, vol.2, Dec. 6, 1992, pp. 1240–1244; Goodman et al Network operators advice and assistance (NOAA): A real–time traffic rerouting expert et al.

Object–Oriented Network Modelling Within an Architecture for International Network Traffic Management; Paul Bassa and Justin Cross, British Telecom.

6–N.M.W.F.–1992; Sixth Network Management Forum, Sydney: Sep. 21–Sep. 25, 1995 Knowledge Based Applications for N.M.

TELECOMMUNICATIONS NETWORK TRAFFIC MANAGEMENT SYSTEM

CROSS-REFERENCES TO RELATED APPLICATIONS

This application is a continuation-in-part of our copending commonly assigned application Ser. No. 08/200,408 filed Feb. 23, 1994.

BACKGROUND OF THE INVENTION

1. Field of the Invention

This invention relates to a telecommunications network comprising a plurality of exchanges, a set of routes for carrying telecommunications traffic between said exchanges, and a traffic management system.

2. Related Art

An international telecommunications network for a particular country may comprise a set of international exchanges connected both to a national network of trunk exchanges and to international exchanges located in other countries. An international telecommunications network may be provided with a traffic management center where network management personnel receive data on traffic passing between the network and networks in other countries. The data includes traffic alarms and the network management personnel respond to these by selecting appropriate remedies with the aim of increasing the volume and proportion of successful traffic. Available remedies include expansive and restrictive controls. Expansive controls spread traffic from congested to less congested areas, whereas restrike controls are used to limit access to the network by traffic with a low chance of successful completion. The task of selecting appropriate remedies in response to traffic alarms in laborious.

BRIEF SUMMARY OF THE INVENTION

According to one aspect of this invention there is provided a telecommunications network comprising a plurality of exchanges, a set of routes for carrying telecommunications traffic between said exchanges, and a traffic management system, said traffic management system composing means for receiving traffic data from said exchanges, means for identifying alarms from said traffic data, means for diagnosing at least one suspected cause for the alarms, means for proposing at least one remedy for each cause, and means for arraying the remedies proposed for each cause in an order of merit.

Arranging the remedies in order of merit assists the network management personnel in selecting a suitable remedy.

Preferably, in the traffic management system, said means for proposing at least one remedy for each cause includes means for requesting data on traffic associated with each cause, and means for reasoning over each cause in relation to the data on traffic associated with the cause in order to propose said at least one remedy.

Desirably, in the traffic management system, the means for arraying the remedies in order of merit includes means for requesting data on traffic in the neighborhood of each remedy and means for reasoning over each remedy in relation to the data on traffic associated with the remedy to compute a figure of merit for the remedy.

In the traffic management system, the means for diagnosing at least one suspected cause for the alarms may include means for proposing at least one suspected cause for said alarms, and means for investing said at least one cause in relation to traffic data.

According to another aspect of this invention, there is provided a traffic management system for a telecommunications network comprising a plurality of exchanges and a set of routes for carrying telecommunications traffic between said exchanges, said traffic management systems comprising:

means for receiving traffic data from said exchange;

means for identifying alarms from said traffic data;

means for diagnosing at least one suspected cause for the alarms;

means for proposing at least one remedy for each cause; and means for arranging the remedies proposed for each cause in order of merit.

According to a further aspect of this invention, there is provided a traffic management system for a telecommunications network comprising a plurality of exchanges and a set of routes for carrying telecommunications traffic between said exchanges, said traffic management systems comprising a computer controlled by a program so as to receive data from said exchanges, identify alarms from said traffic data, diagnose at least one suspected cause for the alarms, propose at least one remedy for each cause, and arrange the remedies proposed for each cause in order to merit.

BRIEF DESCRIPTION OF THE DRAWINGS

This invention will now be described in more detail, by way of example, with reference to the accompanying drawings in which.

DETAILED DESCRIPTION OF THE EXEMPLARY EMBODIMENTS

Figure 1:
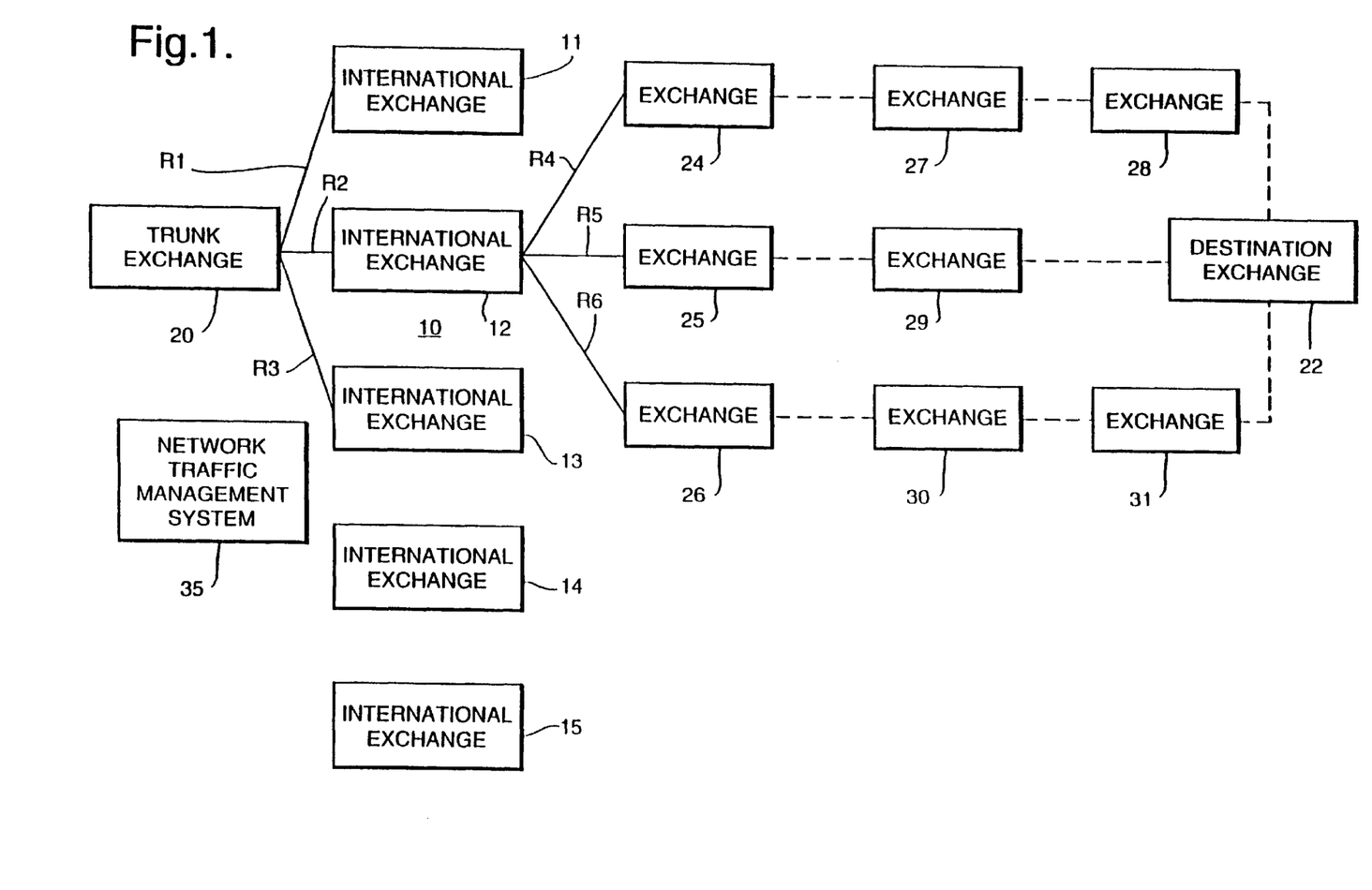
FIG. 1 is a block diagram of an international telecommunications network located in a particular country.

Referring now to FIG. 1, there is shown a block diagram of an international public telecommunications network 10 located in a particular country and its relationship with the national public telecommunications network of that country and telecommunications networks in foreign countries.

The international network 10 comprises five international exchanges 11 to 15. The national network comprises a network of trunk exchanges, each of which is connected to several local exchanges. Each trunk exchange is connected to three of the five international exchanges. For reasons of simplicity, only one trunk exchange, namely trunk exchange 20, is shown in the present example. The trunk exchange 20 is connected to international exchanges 11 to 13, respectively, by traffic routes R1 to R3. The international exchanges 11 to 15 and the truck exchanges 20 are digital exchanges and, by way of example, may be System X exchanges manufactured by GEC Plessey Telecommunications or AXE10 exchanges manufactured by Ericsson Telecommunications.

Each of the international exchanges 11 to 15 is connected to a number of international exchanges located in foreign countries by routes. From each foreign exchange, traffic may be transmitted to a large number of destination exchanges.

By way of example, FIG. 1 shows how traffic may be transmitted from international exchange 12 to a destination exchange 22. International exchange 12 is connected by three routes R4, R5, R6, respectively, to three foreign international exchanges 24, 25 and 26. From the exchange 24, traffic may be transmitted through exchanges 27 and 28 to destination exchange 22. From exchange 25, traffic may be transmitted through exchange 29 to the destination exchange 22, and from exchange 26 traffic may be transmitted through exchanges 30 and 31 to the destination exchange 22. Other routes may exist between exchanges 24, 25, 26 and the destination exchange 22.

For outgoing calls, each of the international exchanges 11 to 15 is provided with a route table for each of the destination exchanges which may be connected to it. Each route table lists the order tin which routes should be tried in attempting to make a connection. For example, for outgoing calls from international exchange 10 to destination exchange 22, the order of routes in the route table is R4, R5, R6. Thus, the international exchange will initially try route R4 when attempting to make a connection to destination exchange 22. If this is unsuccessful, it will try R5 and, if this too is unsuccessful, it will then try R6. International exchange 12 has no control over routes which are followed beyond exchanges 24, 25 and 26 and this is indicated by the dashed lines in FIG. 1. Route tables may be altered by changing the order of the routes, omitting routes or inserting alternative routes.

In the international network 10, traffic is carried along the various routes by a variety of carriers. Suitable carriers are copper cables, fibre optical cables, terrestrial microwave links and satellite links.

Figure 2:
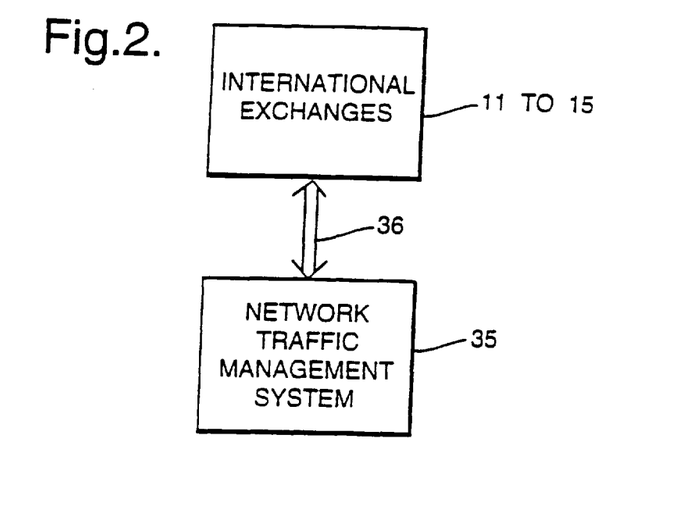
FIG. 2 shows the relationship between the network of FIG. 1 and the associated network traffic management system.

The network 10 includes a network traffic management system 35 located at a traffic management center. Referring to FIG. 2, traffic and network data is transmitted from the international exchanges 11 to 15 to the network traffic management system 35 via a communication channel 36. As will be explained below, the traffic data is analyzed in the traffic management system 35 and the traffic management system proposes, and optionally may apply, suitable controls to the network 10. The controls may be transmitted via communication channel 36.

Figure 3:
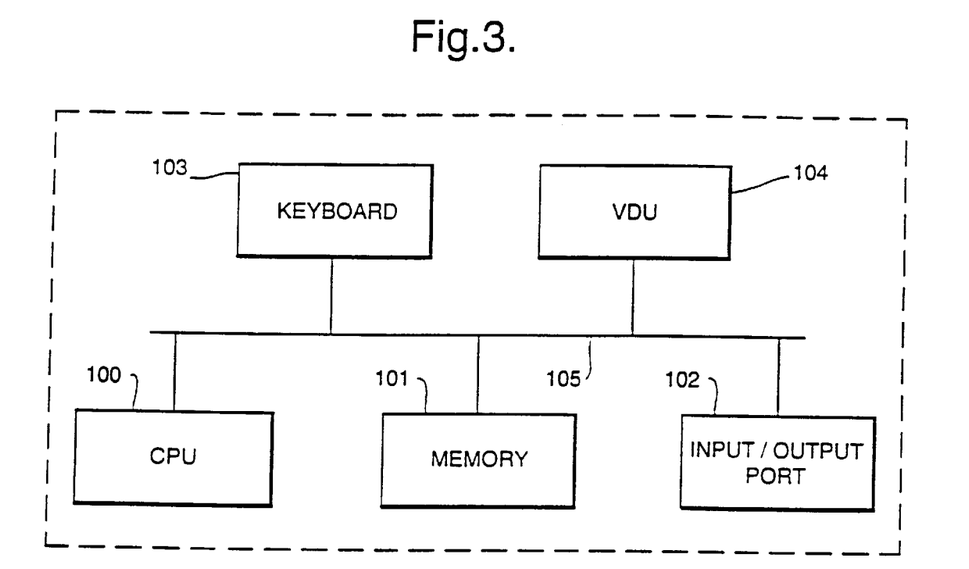
FIG. 3 is a block diagram of a computer used to implement the traffic management system.

The network traffic management system 35 takes the form of a computer. As shown in FIG., 3, the computer comprises a central processing unit (CPU) 100, a memory 101, an input/output port 102, a keyboard 103 and a visual display unit (VDU) 104 connected to a data bus 105. The memory 101 is formed from random access memory (RAM), read-only memory (ROM) and hard and floppy disks. The input/output port 102 is connected to communication channel 36. The memory 101 contains a computer program for controlling the computer. The program is arranged as an expert system, the details of which are set out below.

Figure 4:
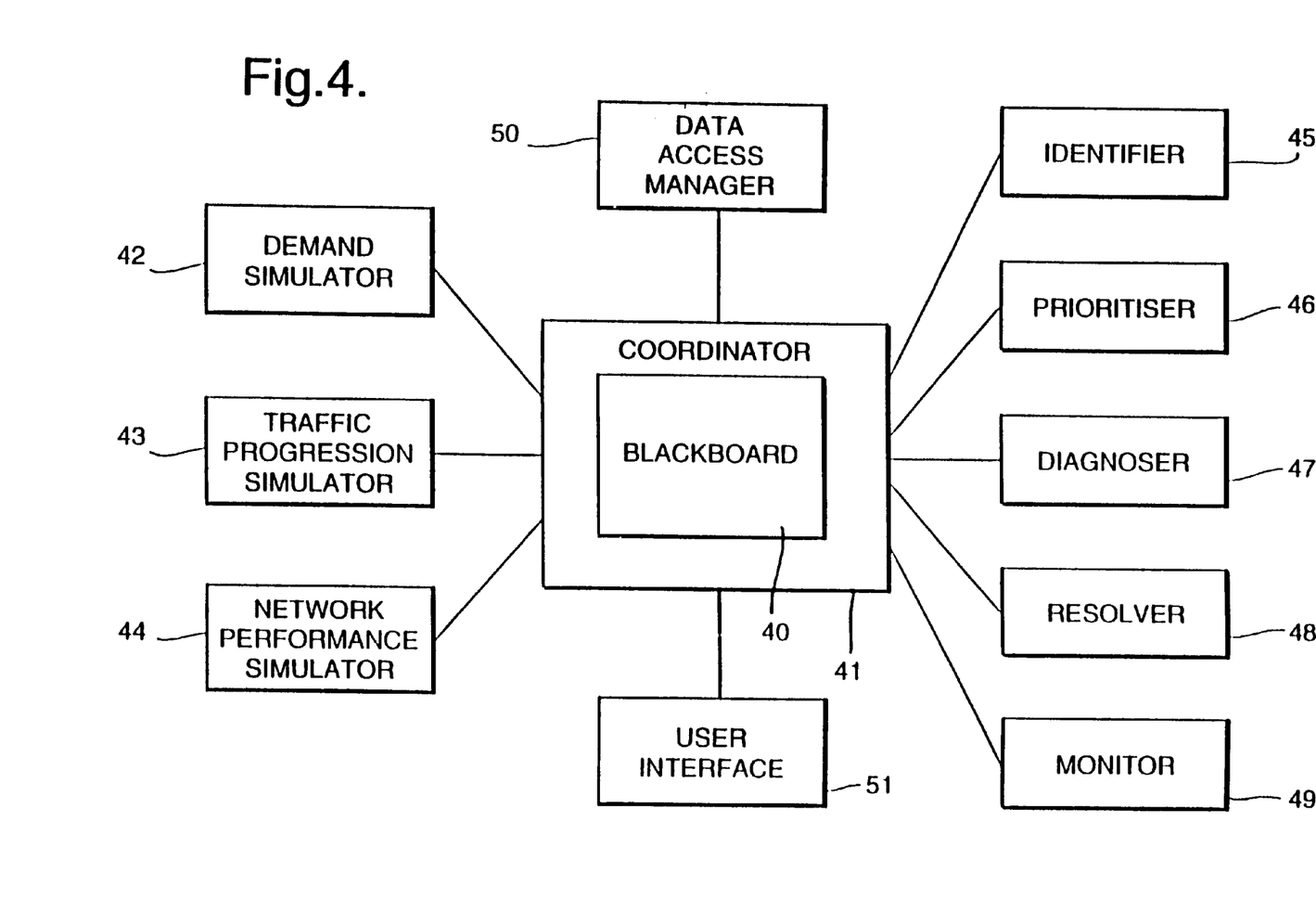
FIG. 4 is a block diagram of an expert system used in the traffic management system.

Referring now to FIG. 4, the expert system is based on a blackboard architecture. The program modules of the expert system comprise a blackboard 40, a coordinator 41, three knowledge sources for simulating traffic in the form of a traffic demand simulator 42, a traffic progression simulator 43, and a network performance simulator 44, five knowledge sources for managing traffic problems in the form of an identifier 45, a 46, a diagnoser 47, a resolver 48 and a monitor 49. The expert system also includes a data access manager 50 and a user interface 51. The data access manager 50 and the user interface 51 are also knowledge sources. These components of the expert system will now be described in more detail.

The blackboard 40 locates information centrally, provides the knowledge sources with access to this information, and acquires data from the knowledge sources via the coordinator. When the blackboard 40 requires information from a knowledge source, the coordinator selects the appropriate knowledge source to obtain the required information. The knowledge sources do not communicate with each other directly.

The blackboard 40 is divided into three partitions, namely, a network modeler, a scenario manager and an event causal network. The scenario manager provides storage of scenario definitions, for example the application of a routing control or the failure of an exchange. The event causal network stores the conclusions of reasoning by the knowledge sources.

The network modeler stores the topology of the network and traffic data for both actual and hypothetical scenarios. The topology includes routing tables for the individual international exchanges and also details of restrive and expansive controls that can be applied to each exchange. The traffic and network data include raw traffic statistics expressed in bids, seizures, and answers, traffic parameters expressed as answer bid ratio, answer seizure ratio, percentage overflow, bid-seizure ratio, and seizures per circuit per hour, percentage of circuits in service on a particular route, and also status alarms for international exchanges. Some of these parameters are included in the traffic data from the international exchanges 11 to 15. Other parameters are calculated in the network modeler from raw traffic values. The meanings of these terms will now be explained with reference to the exchange 12 shown in FIG. 1.

When the exchange 12 attempts to place a call on a circuit of route R4 in order to connect the call to a target number accessed by the destination exchange 22, the attempt is known as a bid. If the call is successfully placed on R4 between exchangres 12 and 24, that is known as a seizure. If the call is successfully answered by the target number, that is known as an answer. If the exchange 12, is not able to connect the call on route R4, it will then try routes R5 and R6. If the attempts on all three routes are unsuccessful, the call will fail. Percentage overflow is the ratio of failed attempts to connect calls to destination numbers accessed by destination exchange 22 to the total number of attempts expressed as a percentage. The remaining parameters are self-explanatory.

The data access manager 50 is responsible for accessing and storing traffic data and traffic profiles from the international exchanges 11 to 15 and for transmitting signals to them to implement expansive and restrictive controls.

The traffic demand simulator 42 obtains standard traffic profiles from the blackboard 40 prepared from historical traffic data. Each profile specifies traffic demand data, under normal circumstances, for calls from one location to another, for example, from a foreign exchange to an exchange in the country in which the network 10 is located. The traffic demand is specified by volume of traffic and average call duration. Under normal circumstances, actual traffic demand for calls from one location to anther will match the profile prepared from historical data. The demand simulator 42 has the ability to modify the standard profiles to take account of a variety of factors including seasonal variations, peak day events, actions taken by foreign administrations, network faults and abnormalities, and unpredictable events such as disasters.

The traffic progression simulator 43 uses data provided by the demand simulator 42 via the blackboard 40 to determine simulated values for bids and seizures on the routes of the network 10 for any given time of day and any given scenario, for example a peak day event or a network fault.

The network performances simulator 44 obtains historical profiles from the blackboard 40 for answer seizure ratios for calls placed on the routes of network 10 for destinations outside the network 10 under normal circumstances. The network performance simulator 44 can modify the standard profiles to provide simulated values for answer seizure ratios for any given time day and any given scenario. Thus, the network performance simulator 44 can modify the standard profiles to take account of various factors such as seasonal variations, peak day events and network faults. The network performance simulator 44 can also modify the standard profiles as the results of comparison between simulated results and real data obtained subsequently.

Figure 5:
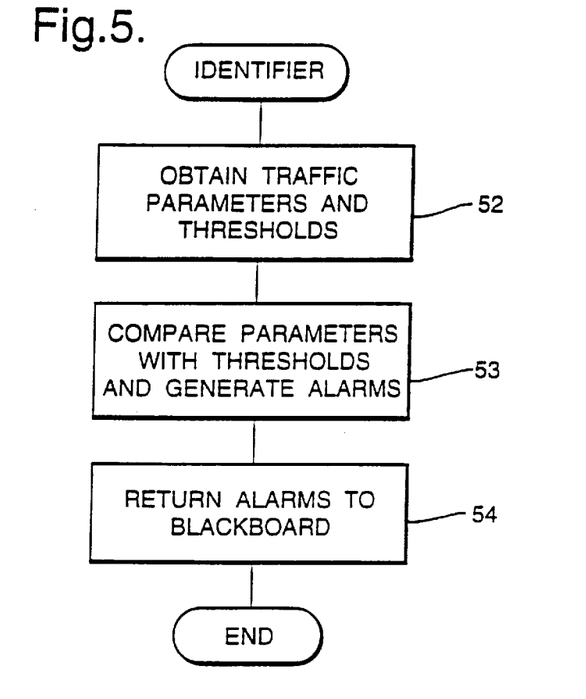
FIGS. 5 to 8 are flow charts illustrating the operation of the expert system.

A flow chart for the identifier 45 is shown in FIG. 5. In a step 52, the identifier 45 obtains values for traffic parameters expressed as answer seizure ratio, answer bid ratio, seizures per circuit per hour, percentage overflow and percentages of circuits in service together with values for the thresholds for these parameters from the blackboard 40. Then, in a step 53, it compares the traffic values with the thresholds and generates an alarm when the value of a parameter is on the alarm side of the threshold for that parameter. In a step 54, the alarms are then returned to the blackboard 40 where they are stored as part of the event causal network.

Figure 6:
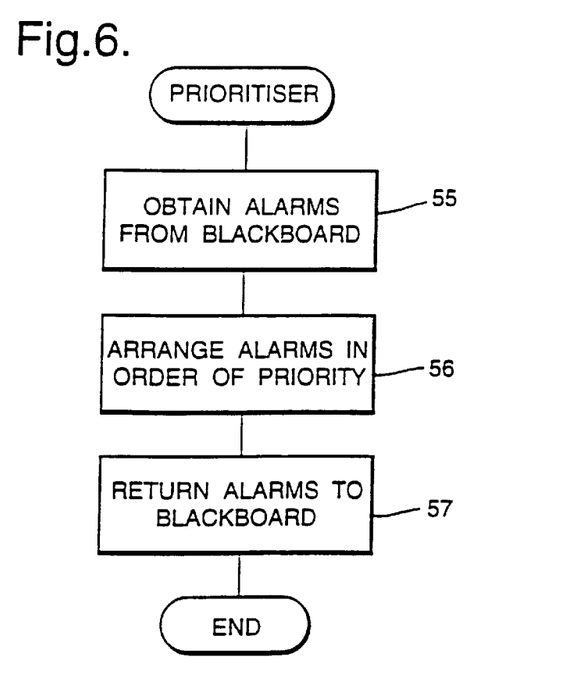

A flow chart for the prioritiser 46 is shown in FIG. 6. In a step 55, the prioritiser obtains the alarms from the blackboard 40. In a step 56, it arranges the alarms in order of priority. More specifically, it arranges the alarms in order of priority on the basis of extent of threshold violation, usage and capacity of the traffic routes, and the number of alarms on a particular route or to a particular destination. In a step 57, it returns the alarms to the blackboard.

Figure 7:
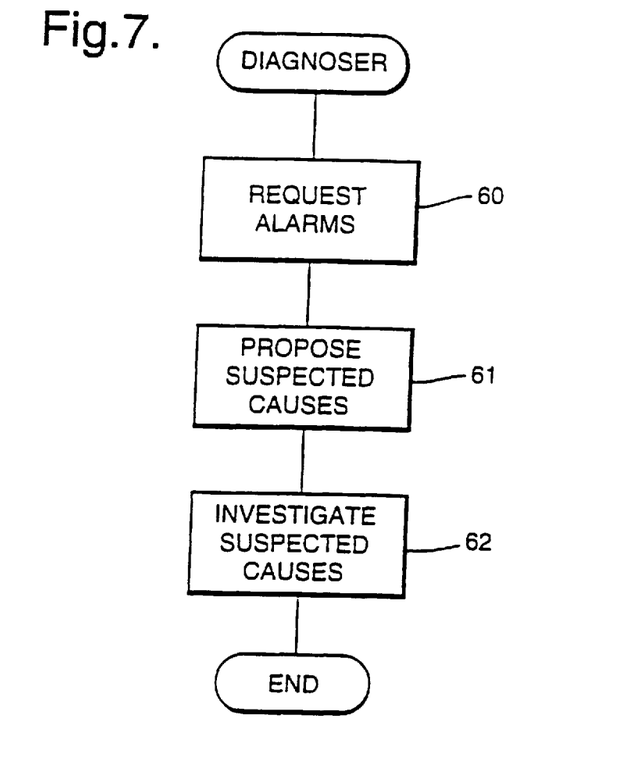

A flow chart for the diagnoser 47 is shown in FIG. 7. In a step 60, the diagnoser requests current alarms and also current traffic and network data from the blackboard 40. Next, in a step 61, the diagnoser uses cause selection rules to propose at least one suspected cause for the alarms. Quite often, a single suspected cause will be found for several alarms. Sometimes a suspected cause in not found for an alarm. Then, in a step 62, the diagnoser 47 uses investigation rules to investigate the suspected causes in relation to the current traffic and network data. The suspected causes and the results of the investigations performed in step 62 are returned to the blackboard 40.

The cause selection and investigation rules used in steps 61 and 62 wil depend partly upon the exact details of the network 10 and the national and foreign networks to which it is connected. An exemplary set of rules is set out below.

In the step 61, if there is a status alarm on one of the international exchange 11 to 15, exchange failure is given as the suspected cause.

If there is a percentage circuits in service alarm on a particular route from one of the international exchanges 11 to 15, transmission failure on the route is given as the suspected cause.

If there is both an answer seizure ratio alarm from one of the international exchanges on a particular route to a foreign destination exchange and also a percentage overflow alarm from the international exchange to the foreign exchange, mass calling to a number served by the destination exchange is given as the suspected cause.

If there is a percentage overflow alarm from one of the international exchange to a foreign destination exchange but no corresponding answer seizure ratio alarm, traffic congestion on routes between the international exchange and the destination exchange is given as the suspected cause.

If there is an answer seizure ratio alarm on a route from one of the international exchanges to a foreign destination exchange but not corresponding percentage overflow alarm, a problem at the destination exchange is given as the suspected cause.

If there is a seizures per circuit per hour alarm on a route from one of the international exchanges, a route quality problem is given as the suspected cause.

Finally, if there is an answer bid ratio alarm on a route from one of the international exchanges to a foreign destination exchange but no corresponding percentage overflow alarm, a problem at the destination exchange is given as the suspected cause.

In step 62, it is not normally appropriate to make investigations in the cases of exchanges failure, transmission failure, or local problem.

If the suspected cause is mass calling, an investigation is made to determine whether the mass calling to the destination exchange is proposed as a suspected cause for just one or more than one of the international exchanges.

If the suspected cause is traffic congestion between an international exchange and a foreign destination exchange, an investigation is made to determine whether there is a percentage circuits in service alarm on any of the routes listed in the route table or calls from the international exchange to the destination exchange. If there is a percentage circuits in service alarm on a particular route, the cause is changed to transmission failure on that route.

Where the suspected cause is a destination problem, an investigation may be made to determine if the problem is before or after an intermediate exchange.

Where the suspected cause is route quality problem, an investigation is made to determine whether there is a corresponding transmission failure.

The results of the investigations are made available to the user of the network management system 35.

Figure 8:
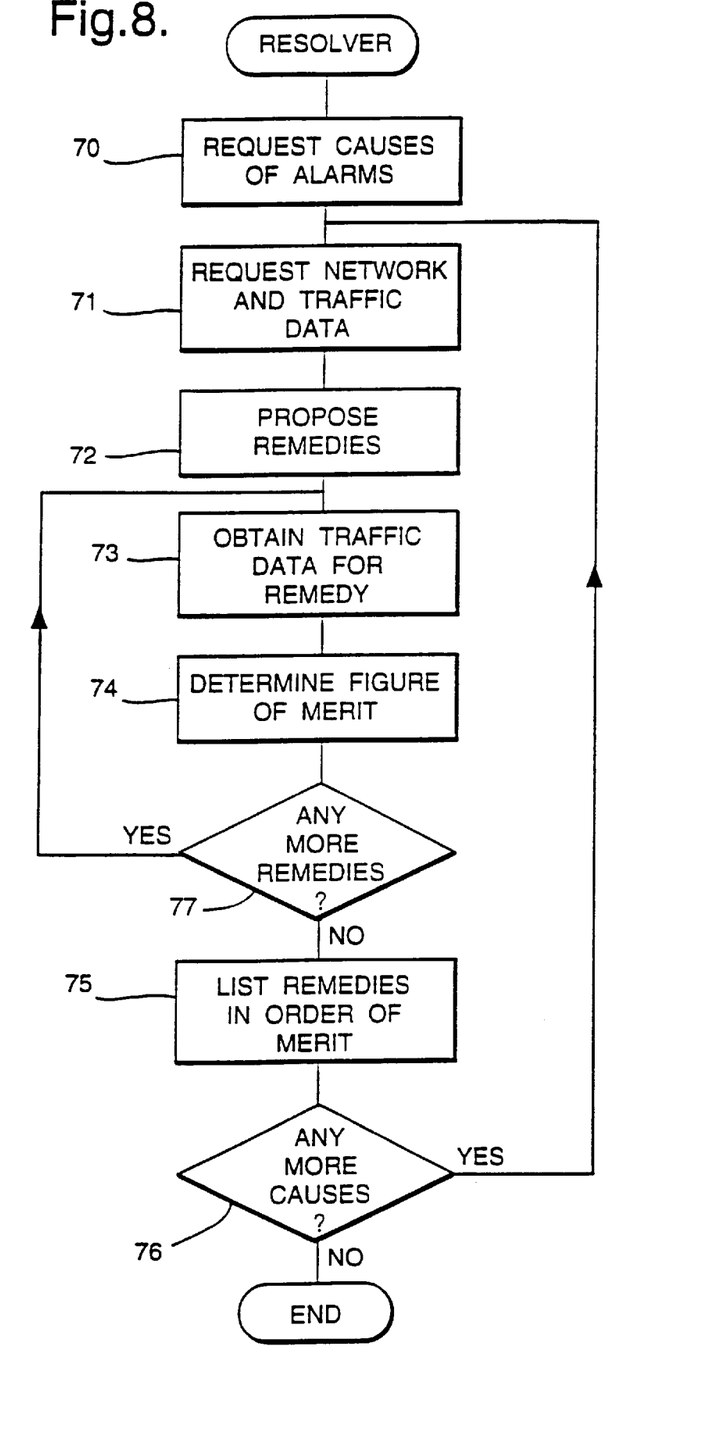

The resolver 48 obtains the causes of the alarms from the blackboard 40 and proposes remedies. The flow chart for the resolver 48 is shown in FIG. 8 and this will now be discussed.

The suspected causes and results of the investigations are obtained in a step 70 from the blackboard 40. After obtaining the causes and the results of the investigations, traffic and network data associated with the first cause are requested in a step 71. Then, in a step 72 using remedy selection rules, the resolver reasons over the cause in relation to the local traffic and network date to propose remedies.

Then in a step 73, for the first proposed remedy, the resolver obtains traffic data which will result from the application of the remedy. The traffic data is obtained from the blackboard 40. Then in a step 74, the resolver 84 determines a figure of merit for the proposed remedy. In determining the figure of merit, the resolver takes account of the effect of applying the proposed remedy and other factors such as priorities, costs and availability of particular routes. In a step 77, the resolver checks if there are any more remedies and repeats steps 73 and 74 until a figure of merit is computed for each proposed remedy. Then, in a step 75, the proposed remedies are listed in order of merit. Proposed remedies are returned to the blackboard 40.

In a step 76 the resolver checks if there are any more causes and repeats steps 71 to 75 for each further cause of the alarms.

The remedy selection rules used in step 71 will depend on the exact details of the network 10 and the networks to which is it connected. The remedy selection rules may be modified in the light of experience. An exemplary set of rules is set out below.

If the cause is failure of an exchange, one or more alternative route are proposed which avoid the exchange in failure. Each proposed alternative route is a separate remedy. Thus, where several alternative routes are proposed, there are several remedies and these are listed in order of merit in step 75.

If the cause is transmission failure on a particular route, the remedy is to remove the route from service.

If the cause is mass calling from only one of the international exchanges 11 to 15 to a particular foreign destination exchange, and one or more appropriate additional routes are available with spare capacity, the insertion of each of the alternative routes into the route table of the international exchange for calls to the foreign destination exchange is proposed as a separate remedy. If appropriate, the insertion of a combination of the alternative routes in the route table may be proposed as another remedy. The alternative routes and, if appropriate, the combination of alternative routes are listed in order of merit in step 75. If no appropriate additional route is available, the remedy is to introduce cell gapping for calls from the international exchange to the foreign exchange. In call gapping a gap of, for example, five seconds is inserted after each successful call during which any further call with fail.

If the cause is mass calling from more than one of the international exchanges to a particular foreign destination exchange, the remedy is to introduce call gapping.

If the cause is traffic congestion between one of the international exchanges and a particular foreign destination exchange, and one or more appropriate additional routes are available with spare capacity, the insertion of each of the alternative routes into the route table of the international exchange for calls to the foreign destination exchange is proposed as a separate remedy. If appropriate, the insertion of a combination of the alternative routes in the route table may be proposed as another remedy. The alternative routes and, if appropriate, the combination of alternative routes are listed in order of merit in step 75. If no appropriate additional route is available, the remedy is to introduce call gapping.

If the cause is a destination problem, and there is no appropriate alternative problem-free destination exchange, the remedy is to reroute calls to the problem-free destination exchange. If there is no problem-free alternative destination exchange, the remedy is to introduce call gapping.

If the cause if a route quality problem, the remedy is to remove the route from service.

If the cause if a local problem at one of the international exchanges with regard to calls to a particular foreign destination exchange, the remedy is to reroute traffic to the foreign destination exchange through another one of the international exchanges.

For each cause, an operator of the traffic management system 35 may implement one of the proposed remedies. In selecting which remedy should be implemented, the operator is guided by the arrangement of the remedies order of merit. Alternatively, the traffic management system 35 may be programmed to implement automatically the remedy which is listed first in order of merit. The selected remedy is transmitted as a control to the network 10 by the data access manager 50.

The monitor 49 monitors the success of the implemented remedies. In order to do this, for each alarm it obtains data on traffic in the neighborhood of the alarm at periodic intervals and monitors trends in traffic in relation to the implemented remedies. It also obtains traffic data from the simulated traffic knowledge sources 42, 43 and 44 for traffic under normal circumstances and compares this traffic data with actual traffic data in order to access the effectiveness of the implanted remedies.

The user interface 51 provides the user with access to data available from the blackboard. This includes the capability to request information not currently present on the blackboard but which can be generated, and placed on the blackboard as a result of a user request. The data which can be displayed includes the available routes between a given exchanges may be located in foreign countries or within the national network associated with the international network 10. The data which can be displayed also includes both actual traffic data and also simulated traffic data for a given scenario, the alarms found by the identifier 45 and as listed by the prioritiser 46, the problems determined by the diagnoser 47 and the remedies proposed by the resolver 48, and the results of the monitoring activity performed by the monitor 49.

The present invention has been described with reference to the international network 10, which connects the national network of the country in which the international network 10 is situated with telecommunications networks in other countries. However, the present invention is not limited to use with this type of network. It may also be used for managing traffic between the individual exchanges of a telecommunications network situated in a particular territory.

We claim:

1. A telecommunication network including a plurality of exchanges, a set of routes for carrying telecommunications traffic between said exchanges, and a traffic management system, said traffic management system composing:

means for receiving traffic data from said exchanges;

means for identifying alarms from said traffic data, said identifying means comparing traffic parameter values derived from said traffic data with threshold valves and identifying an alarm when one of said traffic parameter valves is on the alarm side of a threshold value;

means for diagnosing at least one suspected cause for said alarms by applying predetermined cause selection rules to said alarms;

means for proposing at least one remedy for each cause by applying remedy selection rules to the cause; and means for arranging the remedies proposed for each cause in an order of merit.

2. A telecommunication network as in claim 1, in which, in the traffic management system, said means for proposing at least one remedy for each cause includes:

means for requesting data on traffic associated with each cause, and means for reasoning over each cause in relation to the data on traffic associated with the cause in order to propose said at least one remedy.

3. A telecommunication network as in claim 1 or 2, in which, in the traffic management system, the means for arranging the remedies in order of merit includes:

means for requesting data on traffic associated with each remedy, and means for reasoning over the effect of applying each remedy in relation to the data on traffic in the neighborhood of the remedy to determine a figure of merit for the remedy.

4. A telecommunication system as in claim 1 or 2, in which the traffic management system includes means for arranging alarms in order of priority.

5. A telecommunication network as in claim 1 or 2 in which, the traffic management system, the means for diagnosing at least one suspected cause for the alarms includes means for investigating said at least one suspected cause in relation to traffic data by applying predetermined investigation rules to said at least one cause.

6. A telecommunication system as in claim 1 or 2, includes means for permitting an operator to select and apply one of the proposed remedies.

7. A telecommunications system as in claim 1 or 2, in which the traffic management system includes means for automatically applying the proposed remedy having the greatest merit for each cause.

8. A telecommunication system as in claim 6, in which the traffic management system includes means for monitoring traffic in relation to the applied remedies.

9. A telecommunication system as in claim 1 or 2, including at least one route for carrying telecommunications traffic between the said telecommunications network and anther network.

10. A traffic management system for a telecommunications network including a plurality of exchanges and a set of routes for carrying telecommunications traffic between said exchanges, said traffic management system comprising:

means for receiving traffic data from said exchange;

means for identifying alarms from said traffic data, said identifying means comparing traffic parameter values derived from said traffic data with threshold values and identifying an alarm when one of said traffic parameter values in on the alarm side of a threshold value;

means for diagnosing at least one suspected cause for said alarms by applying predetermined cause selection rules to said alarms;

means for proposing at least one remedy for each cause by applying remedy selection rules to the cause; and means for arranging the remedies proposed for each cause in order of merit.

11. A traffic management system for a telecommunications network comprising:

a plurality of exchanges and a set of routes for carrying telecommunications traffic between said exchanges, said traffic management system comprising a computer controlled by a program so as to:

receive data from said exchanges, identify alarms said traffic data by comparing traffic parameter values derived from said traffic data with threshold value and identify an alarm when one said traffic parameter value is on the alarm side of a threshold value, diagnose at least one suspected cause for the alarms by applying predetermined cause selection rules to said alarms, propose at least one remedy for each cause by applying remedy selection rules to the cause, and arrange the remedies proposed for each cause in order of merit.

12. A telecommunication system as in claim 7, in which the traffic management system includes means for monitoring traffic in relation to the applied remedies.

13. A method for managing a telecommunications network, said telecommunications network composing a plurality of exchanges and a set of routes for carrying telecommunications traffic between said exchanges, the method comprising the steps of:

receiving traffic data from the exchanges;

identifying alarms from said traffic data by comparing traffic parameter values derived from said traffic data with threshold values and identifying an alarm when of said traffic parameter values in on an alarm side of a threshold value;

diagnosing at least one suspected cause for said alarms by applying predetermined cause selection rules to said alarms;

proposing at least one remedy for each cause by applying remedy selection rules to the cause; and arranging the remedies proposed for each cause in an order of merit.

14. The method of claim 13, wherein said step of proposing at least one remedy for each cause includes the steps of:

requesting data on traffic associated with each cause; an reasoning over each cause in relation to the data on traffic associated with the cause in order to propose said at least one remedy.

15. The method of claim 13, wherein the step of arranging the remedies in an order of merit includes the steps of:

requesting data on traffic associated with each remedy; and reasoning over the effect of applying each remedy in relation to the data on traffic in the neighborhood of the remedy to determine a figure of merit for the remedy.

16. The method of claim 13, further comprising the step of:

arranging the alarms in order of priority.

17. The method of claim 13, wherein the step of diagnosing at least one suspected cause for the alarms includes:

investigating said at least one suspected cause in relation to traffic data by applying predetermined investigation rules to said at least one cause.

18. The method of claim 13, further comprising the step of:

selecting and applying on of the proposed remedies.

19. The method of claim 13, further comprising the step of:

automatically applying the proposed remedy having the greatest merit for each cause.

20. The method of claim 18, further comprising the step of:

monitoring traffic in relation to the applied remedies.

* * * * *